United States Patent [19]

Harada et al.

[11] Patent Number: 4,917,840

[45] Date of Patent: Apr. 17, 1990

[54] MOLD COMPRESSION CONTROL PROCESS FOR AN INJECTION MOLDING MACHINE AND APPARATUS THEREOF

[75] Inventors: Susumu Harada; Hideo Tanaka, both of Mishima, Japan

[73] Assignee: Toshiba Machine Company, Ltd., Tokyo, Japan

[21] Appl. No.: 300,720

[22] Filed: Jan. 25, 1989

Related U.S. Application Data

[63] Continuation of Ser. No. 79,425, Jul. 30, 1987, abandoned.

[30] Foreign Application Priority Data

Jul. 30, 1986 [JP] Japan ............................ 61-179575
Aug. 13, 1986 [JP] Japan ............................ 61-189849

[51] Int. Cl.⁴ .......................................... B29C 45/80
[52] U.S. Cl. .............................. 264/40.5; 264/328.11; 425/149; 425/150; 425/590
[58] Field of Search ............... 264/40.1, 40.3, 40.5, 264/294, 328.1, 328.7, 328.11; 425/149, 150, 590, 451.2

[56] References Cited

U.S. PATENT DOCUMENTS

| | | | |
|---|---|---|---|
| 3,857,658 | 12/1974 | Muzsnay | 425/150 |
| 4,592,713 | 6/1986 | Gutjahr | 425/590 |
| 4,594,065 | 6/1986 | Langlois et al. | 425/590 |
| 4,599,063 | 7/1986 | Gutjahr | 425/590 |

FOREIGN PATENT DOCUMENTS

| | | | |
|---|---|---|---|
| 58-194524 | 11/1983 | Japan | 425/590 |
| 1466696 | 3/1977 | United Kingdom | |
| 2079009 | 1/1982 | United Kingdom | |
| 2105064 | 3/1983 | United Kingdom | |
| 2138174 | 10/1984 | United Kingdom | |

Primary Examiner—Jill L. Heitbrink
Attorney, Agent, or Firm—Cushman, Darby & Cushman

[57] ABSTRACT

A method and apparatus controlling an injection molding machine having a compression process. The velocity is controlled using a closed loop single or multi-step programmed velocity control method or a closed loop multi-step programmed slope velocity control method. Pressure may be controlled using a multi-step programmed pressure control method in which a pressure signal is detected from a detector set in the mold die or set in the clamping cylinder. The method of the present invention improves the accuracy and density of articles molded.

4 Claims, 4 Drawing Sheets

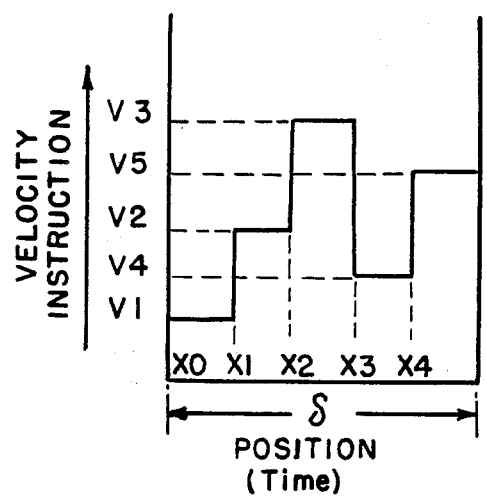
F I G. 4
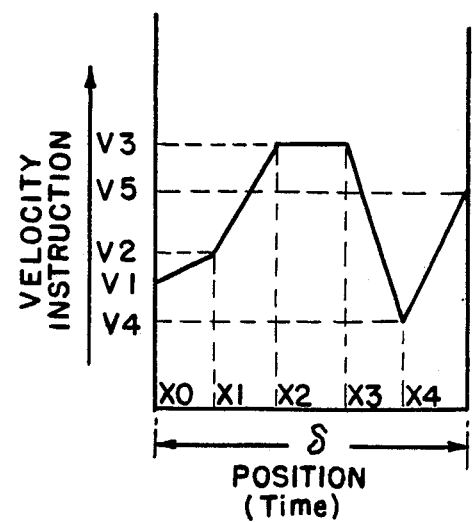
F I G. 5
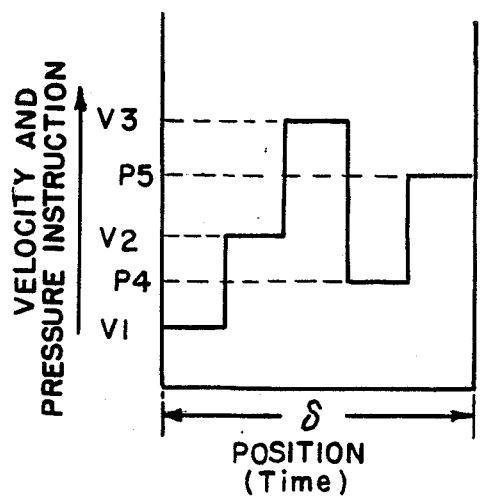
F I G. 6

MOLD COMPRESSION CONTROL PROCESS FOR AN INJECTION MOLDING MACHINE AND APPARATUS THEREOF

This is a continuation of application Ser. No. 07/079,425, filed July 30, 1987, which was abandoned upon the filing hereof.

BACKGROUND OF THE INVENTION

This invention relates to a method for controlling the mold compression process in an injection molding machine. More particularly this invention relates to a method for controlling the pressure and velocity of compression in a compression process.

An injection molding machine utilizes a mold clamping process to compress molten resin which is molded in a cavity. In conventional type injection molded machines the compression process is controlled with a programmed control method wherein the values of pressure to be used for compression are programmed in accordance with positions of an injection plunger or screw mounted on the machine, or in accordance with a plurality of time intervals.

It is difficult in the conventional type injection molding machine to perform high accuracy molding such as is needed for thin plates or resin having high viscosity such as are used to produce articles such as recording discs, records etc. because the velocity of the moving die plate during compression is not kept constant. The velocity fluctuates due to changes in the temperature of the mold die and the pressurized oil. The changes in velocity of the moving die plate cause distortions in form from incomplete filling of the mold if the velocity is too low and cavities in the articles if the velocity is too high.

SUMMARY OF THE INVENTION

It is an object of the present invention to provide a method of controlling the velocity of compression in an injection molding machine.

A feature of the present invention is to provide a programmed velocity control mode and/or a closed loop multi-step programmed velocity slope control mode to control the velocity of compression in an injection molding machine.

An advantage of the present invention is that the velocity of compression in an injection molding machine can be controlled.

These and other objects and advantages of the present invention are accomplished by a method to control the compression of molten resin in a cavity wherein a moving die plate having a first mold die half attached thereto is positioned with respect to a fixed die plate having a second die half mounted thereon so that a compression gap $\delta$ exists between the first mold die half and the second mold die half. Then, a molten resin is injected into the cavity between the die halves. The moving die plate is then moved at velocities changing with respect to a plurality of positions in the range of said compression gap $\delta$.

Once the moving die plate reaches a predetermined position within the range of compression gap $\delta$, it is possible to change the nature of control so that the moving die plate is moved at predetermined programmed pressures which change with respect to a plurality of positions until the gap is zero.

BRIEF DESCRIPTION OF THE DRAWINGS

FIG. 4 is a chart representing velocity instructions corresponding to positions of the plunger in a closed loop multi-step programmed velocity control mode;

FIG. 5 is a chart representing velocity instructions corresponding to positions in the range of a compression gap $\delta$ in a closed loop multi-step programmed velocity slope control mode;

FIG. 6 is a chart representing velocity and pressure instructions corresponding to positions in the range of gap $\delta$ in a closed loop multi-step programmed velocity control and clamping pressure control.

DETAILED DESCRIPTION OF THE PREFERRED EMBODIMENT

Preferred embodiments of an injection molding machine of the present invention will be described in detail with reference to the accompanying drawings.

Figure 1:
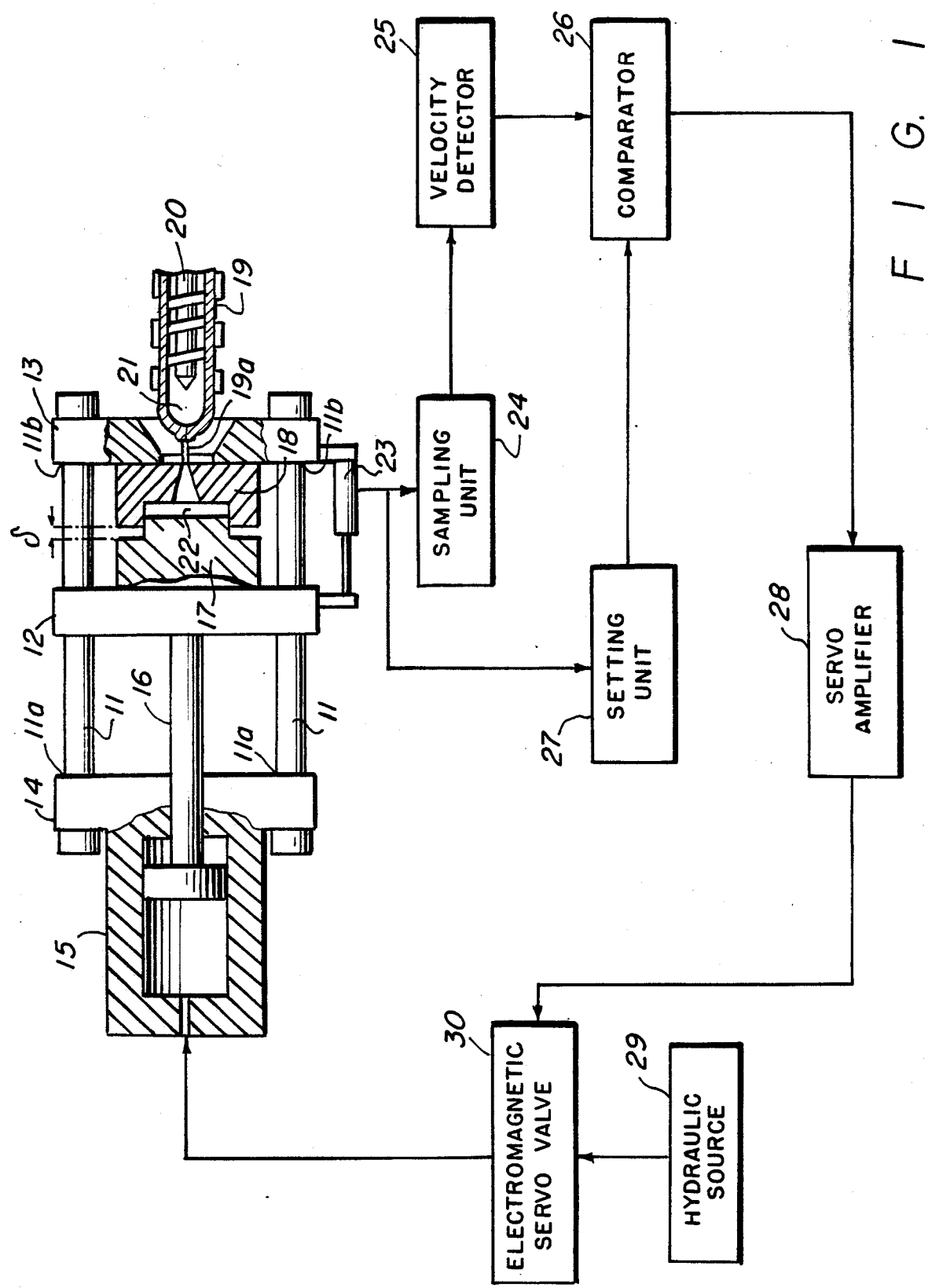
FIG. 1 is a diagram of a first preferred embodiment of the present invention.

In FIG. 1, there is depicted a clamping cylinder 15 which has a flange 14 on which a first end 11a of a tie bar 11 is fixedly mounted. A second end 11b of tie bar 11 is fixedly mounted on a die plate 13.

A moving die plate 12 is slidably mounted on tie bar 11 by any suitable means. A first mold half 17 is mounted on tie bar 11 by any suitable means. A second mold die half 18 is mounted on fixed die plate 13 by any suitable means.

Cylinder 15 has a piston rod 16 fixedly connected by any suitable means to a moving die plate 12.

A cavity 22 defined and delimited by first mold half 17 and second mold half 18 is provided into which a molten resin 21 is injected from an injection cylinder 19. This injection takes place through a channel 19A and may be accomplished by any suitable means but in this preferred embodiment screw 20 is threaded into channel 19A thereby injecting the molten resin therein.

Before molten resin 21 is injected into cavity 22, moving die plate 12 powered by hydraulic source 29 through electromagnetic servo valve 30 is moved to a position creating a predetermined compression gap $\delta$ existing between the first mold die half 17 and the second mold die half 18.

Position detector 23 is mounted on fixed die plate 13. Position detector 23 continuously detects positions of the moving die plate 12, and thereby the first mold die half 17.

A sampling unit 24 electrically processes the detected position value and uses the position value to calculate the velocity at each position.

Setting unit 27 stores a multi-step program and/or a slope program for velocity to control the movement of die plate 12 in the range of compression gap $\delta$. These programs stored in setting unit 27 are started by a signal supplied from position detector 23. Setting unit 27 produces a velocity instruction signal.

As shown in FIG. 1, prior to injecting molten resin 21 into cavity 22, mold die half 17 is held at a position corresponding to the predetermined compression gap $\delta$. Cavity 22 is then filled with molten resin 21 by any conventional injection process.

Immediately after cavity 22 is filled, the compression control process is executed moving die plate 12 in the range of compression gap δ until the gap becomes zero.

FIG. 4 shows the velocity instructions from setting unit 27 corresponding to positions X0, X1, X2, X3 and X4 during the compression process. The chart in FIG. 5 also shows velocity slope instructions from setting unit 27 corresponding to position X0, X1, X2, X3, X4 and X5 during the compression process.

According to the present invention, mold compression velocity of the injection molding machine is stabilized in the early times of compression process and therefore errors of compression velocity derived from temperature drift of the metal die or of hydraulic oil become much lower, so that a stabilized injection molding process can be accomplished repeatedly.

Figure 2:
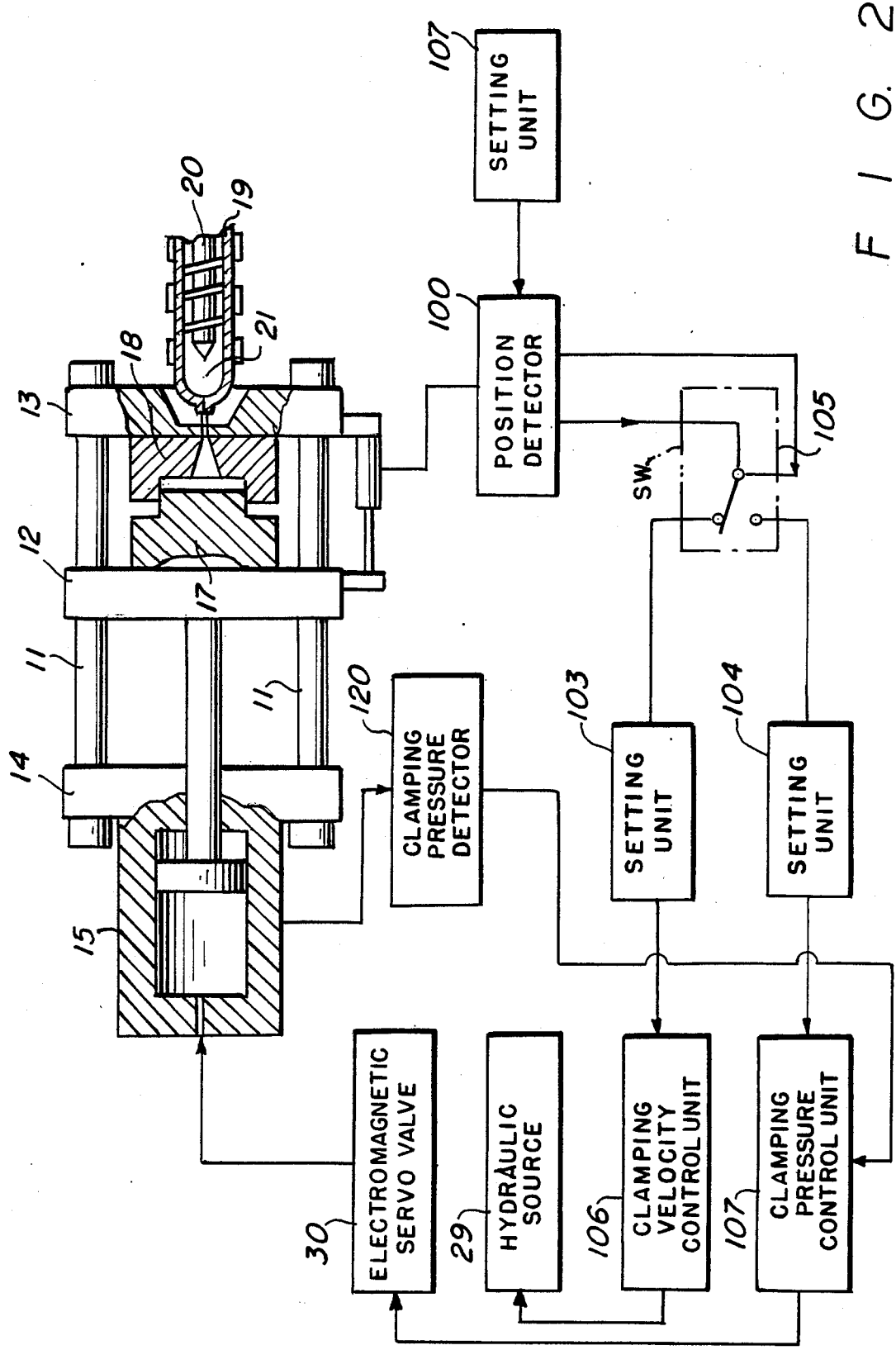
FIG. 2 is a diagram of another preferred embodiment of the present invention.

In another embodiment of the present invention, as shown in FIG. 2, a predetermined position of moving die plate 12 is set optionally in a gap position setting unit 22. A compression velocity control program and compression pressure control program are set optionally in setting units 103 and 104, respectively.

Early during the compression process a selectable switch 105 is set to compression velocity control unit 106. After first mold die half 17 reaches the predetermined position of the compression gap δ, hydraulic oil from hydraulic source 29 to the clamping cylinder 15 is flow-controlled by the electromagnetic servo valve 30 and moving die plate 12 is controlled and moves in accordance with a single or multi-step programmed velocity control set by setting unit 103, as shown in FIG. 6 (velocities V1, V2 and V3 at each position X0, X1 and X2).

At the time when moving die plate 12 reaches the predetermined position set in setting unit 102, selectable switch 105 is changed to setting unit 104 by a signal from a position detector 100 and the mold compression process is controlled with single or multi-step programmed pressure control in accordance with a program set in setting unit 104, as shown in FIG. 6 (pressures P1, P2 at positions X3, X4). During the pressure controlled compression process the pressure of cylinder 15, as monitored by pressure detector 120 is maintained at the pressure set by setting unit 104 as controlled by control unit 107. Instead of measuring pressure in cylinder 15, it is also possible to measure pressure in cavity 22.

In FIG. 2, the timing of changing selectable switch 105 from setting unit 103 to 104 is defined by the signal from position detector 100.

Figure 3:
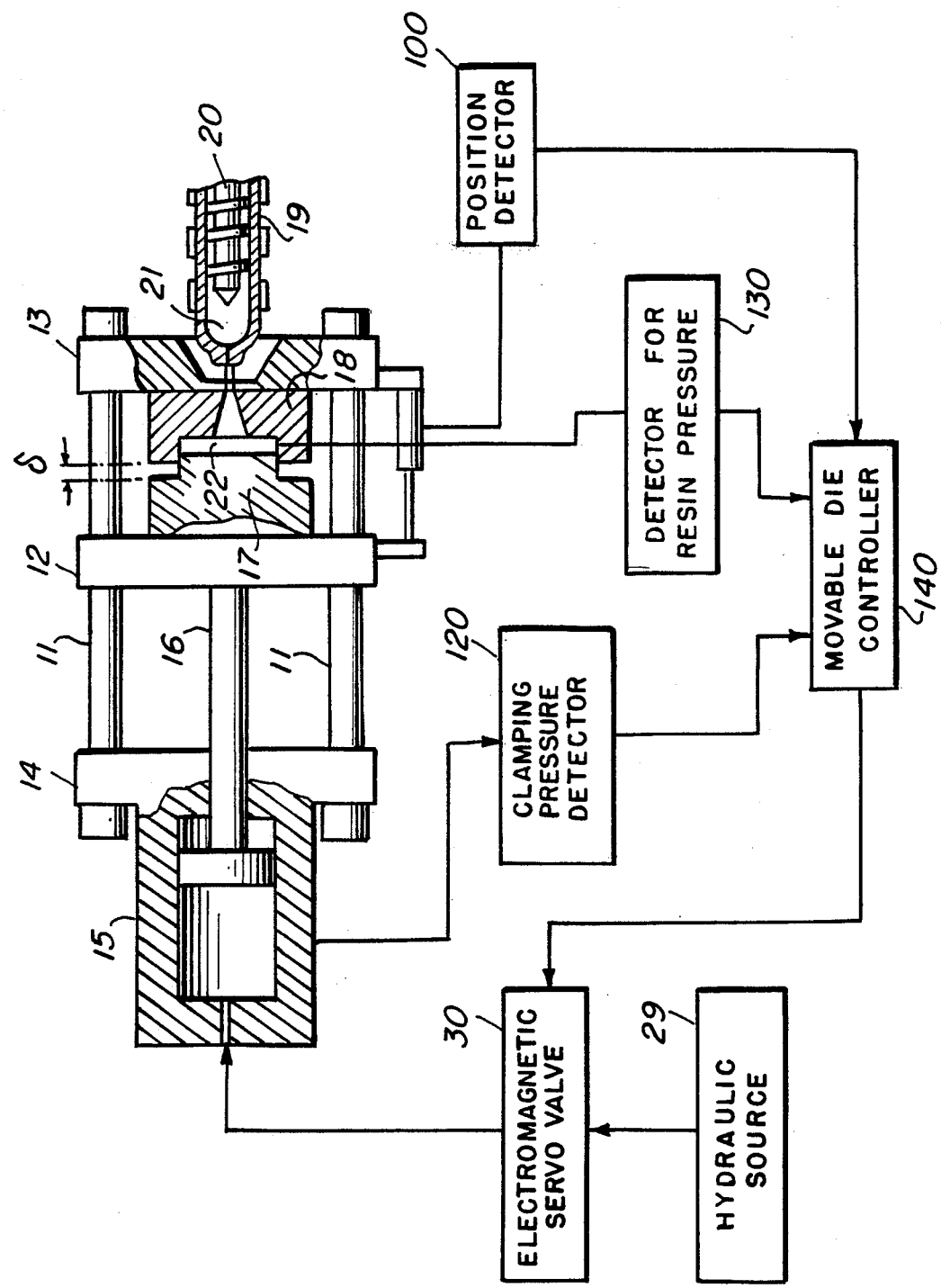
FIG. 3 is a diagram of various detectors used for the position detector in FIG. 2.

FIG. 3 illustrates a detector 130 for resin pressure in the cavity or compression pressure detector 120 which may be utilized instead of, or in cooperation with, position detector 100. The detectors are all connected to movable die controller 140 which controls valve 30.

In FIG. 1, setting unit 27 produces signals corresponding to a plurality of instruction velocities in accordance with position signals from position detector 23. However, it may be modified to form another setting unit different from the setting unit 27 shown in FIG. 2. This other setting unit may be formed so as to produce signals corresponding to a plurality of instruction velocities in accordance with a plurality of time intervals during which the moving die plate 12 stays at each region in the range of compression gap δ. In such a case, the other setting unit may be provided with a timer counter. In FIG. 4, FIG. 5 and FIG. 6, "TIME" refers to a substitute for position. Similar modification may be applied to both of setting units 103 and 104.

As described above, the present invention achieves remarkable effects in that the several programmed conditions can be set for various kinds of resin or for various types of the mold dies. Also, excellent molded articles with high transcriptivity can be made by applying velocity control to the mold compression control in the early times of compression process. Furthermore, those articles with high density can be made stably by applying pressure control in the latter time intervals of the compression process.

Numerous variations, within the scope of the appended claims, will be apparent to those skilled in the art in light of the foregoing description and accompanying drawings. Therefore, persons of ordinary skill in this field are to understand that all such equivalent structures are to be included within the scope of the following claims.

What is claimed is:

1. A method for controlling the compression of molten resin in a cavity in an injection molding machine, said injection molding machine having a moving die plate and a fixed die plate, said moving die plate having a first mold die half mounted thereon and said fixed die plate having a second mold die half mounted thereon, said method comprising the steps of:
   moving said moving die plate to a predetermined position to form a compression gap between said first mold die half and said second mold die half;
   then injecting said molten resin into said cavity; and
   then moving said moving die plate at velocities controlled to predetermined values with respect to a plurality of positions of said moving die plate in a range of said compression gap.

2. A method for controlling the compression of molten resin in a cavity in an injection molding machine, said injection molding machine having a moving die plate with a first mold die half mounted thereon and a fixed die plate with a second mold die half mounted thereon, comprising the steps of:
   moving the moving die plate to a predetermined position to form a compression gap between said first mold die half and said second mold die half;
   then injecting the molten resin into said cavity;
   then moving said moving die plate at predetermined programmed velocities changing with respect to a plurality of positions until said moving die plate reaches a predetermined position in a portion of said compression gap; and
   then moving said moving die plate at predetermined programmed pressures changing with respect to a plurality of positions in a remaining portion of said compression gap.

3. A mold compression apparatus for compressing molten resin after an injection process comprising:
   a fixed die plate;
   a first mold die half mounted on said fixed die plate;
   a moving die plate movable relative to said fixed die plate within a compression gap;
   a second mold die half mounted on said moving die plate so as to face said mold die half;
   means for driving the moving die plate;
   means for detecting a position of the moving die plate and producing a signal representing actual velocity of said moving die plate;
   a velocity instruction means for instructing a velocity of said moving die plate during compression, said velocity instruction means instructing said velocity of said moving die plate with respect to a plurality of positions of said die plate within said compression gap;

a comparison means for producing an error signal by comparing said instructed velocity with said signal representing actual velocity; and a drive control means, responsive to said error signal, for producing a drive signal to said drive means.

4. An apparatus for controlling a mold compression process for compressing molten resin after an injection process comprising:

a fixed die plate;

a first mold die half mounted on said fixed die plate;

a moving die plate movable relative to said fixed die plate within a compression gap;

a second mold die half mounted on said moving die plate;

means for driving the moving die plate;

means for detecting a position of said moving die plate during compression and producing a signal representing actual position of said moving die plate, and producing a change over signal predeterminedly set by a position setter;

mold compression velocity instruction means for instructing a moving velocity of said moving die plate during said compression operation, said velocity instruction means instructing said moving velocity of said die with respect to a plurality of positions of said die plate within said compression gap;

mold compression velocity control means, responsive to the instructed moving velocity for applying a signal to said drive means to drive said moving die plate at said instructed moving velocity;

mold compression pressure instruction means for instructing a pressure in the mold during said compression operation;

mold compression pressure control means, responsive to the instructed mold compression pressure for applying a drive signal to said drive means to drive said moving die plate to maintain said instructed mold compression; and switch means, responsive to said change over signal for changing over control of said drive means from said mold compression velocity control means to said mold compression pressure control means.

* * * * *